(12) United States Patent
Zhang (10) Patent No.: US 11,956,285 B2
(45) Date of Patent: Apr. 9, 2024

(54) INFORMATION PROCESSING METHOD, ELECTRONIC DEVICE, AND STORAGE MEDIUM FOR DATA SHARING IN A COMMUNICATION GROUP

(71) Applicant: Lenovo (Beijing) Limited, Beijing (CN)

(72) Inventor: Liang Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/679,000

(22) Filed: Feb. 23, 2022

(65) Prior Publication Data

US 2023/0102708 A1 Mar. 30, 2023

(30) Foreign Application Priority Data

Sep. 30, 2021 (CN) .......................... 202111158540.9

(51) Int. Cl.
*H04L 65/1083* (2022.01)
*H04L 65/403* (2022.01)

(52) U.S. Cl.
CPC ........ *H04L 65/1086* (2013.01); *H04L 65/403* (2013.01)

(58) Field of Classification Search
CPC . H04L 65/403; H04L 65/493; H04L 65/1069; H04L 65/1083; H04L 65/1086; H04L 65/1089; H04L 65/1093; H04L 65/4015; H04L 65/4069; H04L 12/12; H04L 12/18; H04L 12/1827; H04L 51/224; H04L 29/06401; H04L 67/10; H04N 7/15; H04N 7/155; H04M 3/56; G06F 3/147; G06F 3/1454
USPC .......................................................... 709/204
See application file for complete search history.

(56) References Cited

U.S. PATENT DOCUMENTS

| 8,554,897 | B2 * | 10/2013 | Kim ...................... H04L 65/403 715/761 |
| 9,270,611 | B2 * | 2/2016 | Ji ............................. H04L 47/70 |
| 9,949,100 | B2 * | 4/2018 | Slotte ...................... H04W 4/21 |

(Continued)

FOREIGN PATENT DOCUMENTS

CN 104780225 A 7/2015

*Primary Examiner* — James N Fiorillo
(74) *Attorney, Agent, or Firm* — ANOVA LAW GROUP, PLLC (57) ABSTRACT

An information processing method, an electronic device, and a storage medium are provided in the present disclosure. The method includes performing communication based on a communication group, and obtaining a first sharing operation of a target identification (ID) for data corresponding to a first hardware resource, where the first hardware resource belongs to an electronic device corresponding to the target ID, and the target ID belongs to the communication group; based on the first sharing operation, determining at least one sharing ID from the communication group, where the at least one sharing ID is a part of IDs in the communication group; and in response to the first sharing operation and in a process of performing the communication based on the communication group, sharing the data corresponding to the first hardware resource with a terminal device corresponding to the at least one sharing ID in real time.

17 Claims, 6 Drawing Sheets

(56) References Cited

U.S. PATENT DOCUMENTS

| | | | |
|---|---|---|---|
| 2012/0019560 A1* | 1/2012 | Inoue | H04L 67/14 |
| | | | 345/634 |
| 2012/0191832 A1* | 7/2012 | Kim | H04L 65/403 |
| | | | 709/223 |
| 2016/0105775 A1* | 4/2016 | Azmat | H04W 76/40 |
| | | | 455/518 |
| 2017/0048286 A1* | 2/2017 | Ichihashi | H04L 65/611 |
| 2017/0235848 A1* | 8/2017 | Van Dusen | G06Q 30/0201 |
| | | | 705/12 |
| 2019/0124177 A1* | 4/2019 | Garg | H04L 67/306 |
| 2019/0230319 A1* | 7/2019 | Gero | H04L 65/765 |
| 2019/0303087 A1* | 10/2019 | Tsukamoto | H04L 12/1822 |
| 2020/0037211 A1* | 1/2020 | Hinc | H04W 36/0058 |
| 2020/0301647 A1* | 9/2020 | Yoshida | H04L 65/403 |
| 2022/0083306 A1* | 3/2022 | Koyama | H04L 12/12 |
| 2022/0239617 A1* | 7/2022 | Yan | H04L 12/1895 |
| 2022/0300243 A1* | 9/2022 | Dai | H04L 65/1089 |
| 2023/0096782 A1* | 3/2023 | Crumley | H04N 7/155 |
| | | | 348/14.08 |

\* cited by examiner

INFORMATION PROCESSING METHOD, ELECTRONIC DEVICE, AND STORAGE MEDIUM FOR DATA SHARING IN A COMMUNICATION GROUP

CROSS-REFERENCE TO RELATED APPLICATION

This application claims the priority of Chinese Patent Application No. 202111158540.9, filed on Sep. 30, 2021, the content of which is incorporated herein by reference in its entirety.

TECHNICAL FIELD

The present disclosure generally relates to the field of data technology, and, more particularly, relates to an information processing method, an information processing apparatus, an electronic device, and a storage medium.

BACKGROUND

Currently, there are no restrictions in data sharing, and all participants in a network environment can receive the shared data. For example, during a multi-person online video call, when the camera is turned on, all participants in the conference can see the captured image of the camera. It can be noted that the current data sharing has the problem that the sharing is only in single mode and without limitation.

SUMMARY

One aspect of the present disclosure provides an information processing method. The method includes performing communication based on a communication group, and obtaining a first sharing operation of a target identification (ID) for data corresponding to a first hardware resource, where the first hardware resource belongs to an electronic device corresponding to the target ID, and the target ID belongs to the communication group; based on the first sharing operation, determining at least one sharing ID from the communication group, where the at least one sharing ID is a part of IDs in the communication group; and in response to the first sharing operation and in a process of performing the communication based on the communication group, sharing the data corresponding to the first hardware resource with a terminal device corresponding to the at least one sharing ID in real time.

Another aspect of the present disclosure provides an electronic device. The device includes a processor, a memory, and a communication bus, where the communication bus is configured to implement a communication connection between the processor and the memory; and the processor is configured to execute an information processing program stored in the memory to implement above-mentioned information processing method.

Another aspect of the present disclosure provides a computer storage medium stores one or more programs. The one or more programs may be executed by one or more processors to implement above-mentioned information processing method.

DETAILED DESCRIPTION

The technical solutions in embodiments of the present disclosure are clearly and completely described below with reference to the accompanying drawings in embodiments of the present disclosure.

Unless otherwise defined, all technical and scientific terms used herein have the same meaning as commonly understood by those skilled in the art in the technical field of the present disclosure. The terms used herein are only for the purpose of describing embodiments of the present disclosure and are not intended to limit the present disclosure.

Figure 1:
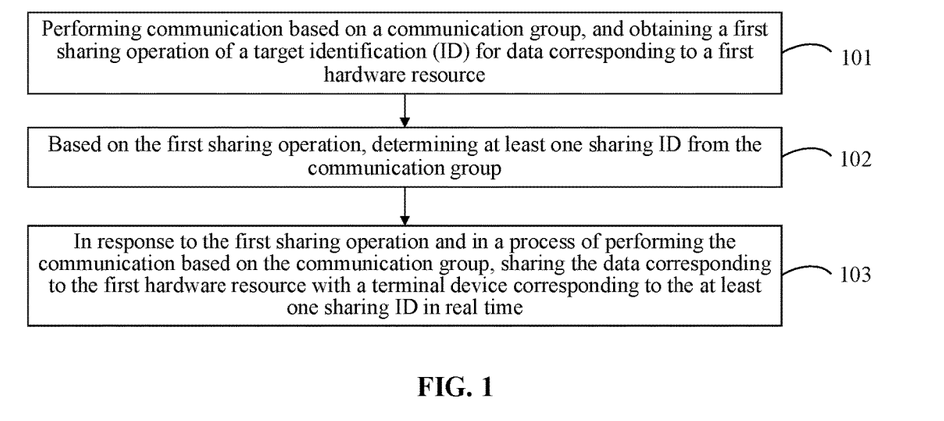
FIG. 1 illustrates a flowchart of an exemplary information processing method according to various disclosed embodiments of the present disclosure.

Embodiments of the present disclosure provide an information processing method. The information processing method may be applied to an electronic device. Referring to FIG. 1, the method may include the following.

At 101, communication may be performed based on a communication group, and the first sharing operation of a target identification (ID) for data corresponding to the first hardware resource may be obtained.

The first hardware resource may belong to the electronic device corresponding to the target ID; and the target ID may belong to the communication group.

In one embodiment of the present disclosure, the communication group may include at least three IDs representing three group users. Different group users may join the communication group through their respective electronic devices, and each group user may have a unique group ID in the communication group.

The information processing method provided in the present disclosure may implement intelligent data sharing and may be applied to conference scenarios or teaching scenarios. The present disclosure may not limit application scenarios.

For ease of description, the conference scenario may be taken as an example. Before joining the conference or during the conference, the electronic device may communicate based on the communication group and obtain the first sharing operation of the target ID for the data corresponding to the first hardware resource. The first hardware resource may belong to the electronic device corresponding to the target ID. The first hardware resource may be the information carrier of shared data, which is the medium that carries the shared data in information (e.g., the shared data) transfer. That is, the first hardware resource is the basis for carrying information, that is, the entity used to record, transmit, accumulate, and save the shared data. The first hardware resource may include, but not be limited to, the input and/or input hardware resource of the electronic device. Exemplarily, the first hardware resource may include a screen, a camera, and a microphone of the electronic device.

Furthermore, in the process that the electronic device performs the communication based on the communication group, in the case of obtaining the first sharing operation of the data corresponding to the first hardware resource by the target ID, it may indicate that the real-time sharing operation of the data corresponding to the first hardware resource is obtained. For example, a sharing operation of real-time display data of a screen may be obtained; a sharing operation of video data collected in real time by a camera may be obtained; or a sharing operation of audio data collected in real time by a microphone may be obtained.

At 102, at least one sharing ID may be determined from the communication group based on the first sharing operation.

At least one sharing ID may be a part of IDs in the communication group.

In embodiments of the present disclosure, when the electronic device performs the communication based on the communication group and obtains the first sharing operation of the data corresponding to the first hardware resource by the target ID, at least one sharing ID may be determined from the communication group based on the first sharing operation. That is, a limited manner of sharing data may be performed, and a part of the IDs may be selected from the communication group as the sharing objects of the data corresponding to the first hardware resource, instead of directly sharing the data corresponding to the first hardware resource to all terminal devices corresponding to the IDs in the group.

At 103, in response to the first sharing operation and in the process of performing the communication based on the communication group, the data corresponding to the first hardware resource may be shared with the terminal device corresponding to at least one sharing ID in real time.

In embodiments of the present disclosure, when the electronic device selects at least one sharing ID from the communication group and in the process of performing the communication based on the communication group, the data corresponding to the first hardware resource may be shared with the terminal device corresponding to at least one sharing ID in real time. Herein, the sharing of the data corresponding to the first hardware resource may be in real time. That is, once the sharing is triggered, the real-time data provided for the first hardware resource may be continuously shared in case of the sharing is not triggered to be stopped, which is different from the existing technology where a shared content is selected and sent to the receiving terminal to complete the sharing. The real-time data may always be shared if the first hardware resource enters the stage of sharing its corresponding data, and the sharing may continue in case of the sharing is not triggered to be stopped.

It should be noted that in the process of performing the communication based on the communication group, the electronic device corresponding to the target ID may not only share the data corresponding to its own first hardware resource in a limited manner, but also obtain data transmitted by terminal devices corresponding to other IDs in the communication group. For other IDs in the communication group, this limited sharing manner may also be used to share the data corresponding to the hardware resources of electronic devices.

For the information processing method provided by embodiments of the present disclosure, the communication may be performed based on the communication group, and the first sharing operation of the target ID for the data corresponding to the first hardware resource may be obtained; the first hardware resource may belong to the electronic device corresponding to the target ID; the target ID may belong to the communication group; at least one sharing ID may be determined from the communication group based on the first sharing operation; at least one sharing ID may be a part of IDs in the communication group; and in response to the first sharing operation and in the process of performing the communication based on the communication group, the data corresponding to the first hardware resource may be shared with the terminal device corresponding to at least one sharing ID in real time. In such way, in the communication scenario of group communication, the group user corresponding to the target ID may determine the sharing object of the data corresponding to the first hardware resource in real time through the first sharing operation on the data corresponding to the first hardware resource, and further share the data corresponding to the first hardware resource in real time with the terminal device corresponding to a real-time selected sharing ID. Moreover, in the present disclosure, the data corresponding to the first hardware resource may be shared in real time, that is, once the sharing is triggered, the sharing may continue in case of the sharing is not triggered to be stopped, thereby providing a limited manner of sharing data and improving the intelligence of the electronic device.

Figure 2:
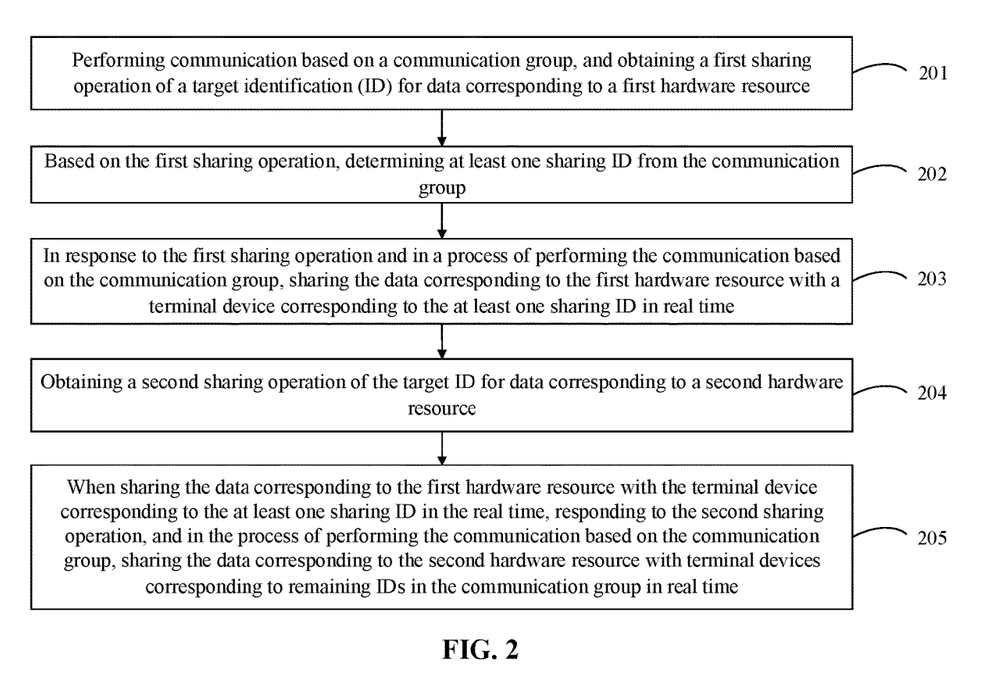
FIG. 2 illustrates another flowchart of an exemplary information processing method according to various disclosed embodiments of the present disclosure.

Embodiments of the present disclosure provide an information processing method. The information processing method may be applied to an electronic device. Referring to FIG. 2, the method may include the following.

At 201, the communication may be performed based on the communication group, and the first sharing operation for the data corresponding to the first hardware resource by the target ID may be obtained.

The first hardware resource may belong to the electronic device corresponding to the target ID; and the target ID may belong to the communication group.

At 202, at least one sharing ID may be determined from the communication group based on the first sharing operation.

At least one sharing ID may be a part of IDs in the communication group.

At 203, in response to the first sharing operation and in the process of performing the communication based on the communication group, the data corresponding to the first hardware resource may be shared with the terminal device corresponding to at least one sharing ID in real time.

At 204, the second sharing operation for the data corresponding to the second hardware resource by the target ID may be obtained.

The second hardware resource may belong to the electronic device, and the second hardware resource may be different from the first hardware resource.

In embodiments of the present disclosure, the data corresponding to different hardware resources of the electronic device may be selected as the shared data. Herein, the sharing of data corresponding to different hardware resources may be performed simultaneously without affecting each other.

At 205, when sharing the data corresponding to the first hardware resource with the terminal device corresponding to at least one sharing ID in the real time, responding to the second sharing operation, and in the process of performing the communication based on the communication group, the data corresponding to the second hardware resource may be shared with terminal devices corresponding to remaining IDs in the communication group in real time.

The communication group is a group formed by remaining IDs and the target ID.

In embodiments of the present disclosure, in the process of the electronic device performing the communication based on the communication group, when the target ID selects the data corresponding to the first hardware resource, which is shared with the terminal device corresponding to at least one sharing ID in the communication group, the target ID may also select the data corresponding to the second hardware resource, which is shared with terminal devices corresponding to remaining IDs other than the target ID in the communication group. Therefore, limited sharing of the data corresponding to some hardware resources of the electronic device may be realized, and the data corresponding to some hardware resources may be shared unlimitedly, which may support a variety of sharing scenarios and increase flexibility of different data sharing.

In an implementable sharing scenario, taking the conference scenario as an example, the user may use the target ID as the identity to join the conference system through an electronic device. At this point, the electronic devices may perform the communication based on the communication group, and the communication group may be a conference group after the user joins. The electronic device may obtain the first sharing operation of the target ID for the real-time video data collected by its own camera. The electronic device may determine at least one sharing ID from the communication group based on the first sharing operation, and in response to the first sharing operation, share the real-time video data collected by the camera with the terminal device corresponding to at least one sharing ID in real time during the communication based on the communication group. The electronic device may obtain the second sharing operation of the target ID for the data corresponding to the microphone. In the process of sharing the real-time video data collected by the camera to the terminal device corresponding to at least one sharing ID in real time, the electronic device may respond to the second sharing operation, and in the process of communicating based on the communication group, may share the real-time audio data collected by the microphone with terminal devices corresponding to remaining IDs in the communication group in real time. At this point, all users indicated by other IDs different from the target ID in the conference system may receive the real-time audio data through their respective terminal devices. It can be noted that in the process of multi-data sharing, the real-time sharing of pictures of the user indicated by the target ID collected in real time by the camera of the electronic device and the real-time sharing of the audio content of the user indicated by the target ID collected in real time by the microphone of the electronic device may be synchronized without affecting each other. At this point, all participants may hear the speaker's real-time audio data, but some of these participants may view speaker's real-time pictures, while others may not view the speaker's real-time pictures.

Figure 3:
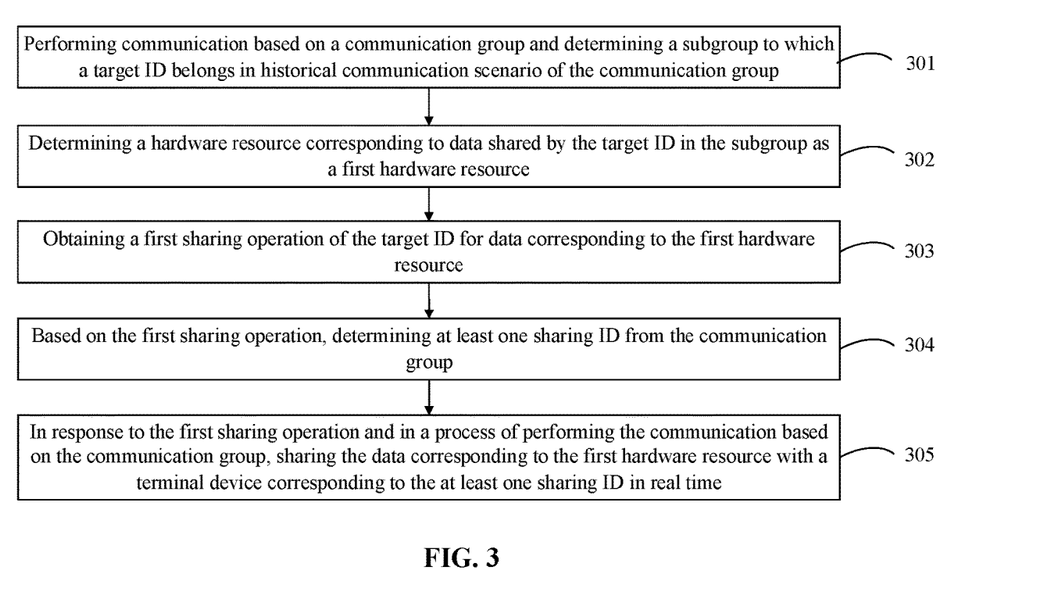
FIG. 3 illustrates another flowchart of an exemplary information processing method according to various disclosed embodiments of the present disclosure.

Embodiments of the present disclosure provide an information processing method. The information processing method may be applied to an electronic device. Referring to FIG. 3, the method may include the following.

At 301, the communication may be performed based on the communication group, and the subgroup to which the target ID belongs in the historical communication scenario of the communication group may be determined.

A subgroup may be a group formed by a part of IDs.

At 302, the hardware resource corresponding to the data shared by the target ID in the subgroup may be determined as the first hardware resource.

In embodiments of the present disclosure, the electronic device corresponding to the target ID may automatically choose to share the data corresponding itself certain hardware resources, and automatically select to share such data with the terminal devices corresponding to certain IDs in the communication group, which may not only realize limited data sharing, but also support intelligent automatic selection, simplify user operations, and further improve the intelligence of electronic devices.

In an implementation scenario, the electronic device may, based on the subgroup that the target ID joins and the hardware resource that the data shared in the subgroup comes from in the historical communication scenario of the communication group, determine the data to be shared and share the data with the terminal devices correspond to certain IDs in the communication group when the target ID subsequently communicates in a same communication group.

In another implementation scenario, the electronic device may also preset certain data corresponding to its own hardware resources to be limited sharing data; and according to the time of joining the group of each ID in the communication group, may automatically determine that certain terminal devices corresponding to IDs have partial authorization to receive and share data.

At 303, the first sharing operation of the target ID for the data corresponding to the first hardware resource may be obtained.

The first hardware resource may belong to the electronic device corresponding to the target ID; and the target ID may belong to the communication group.

At 304, at least one sharing ID may be determined from the communication group based on the first sharing operation.

At least one sharing ID may be a part of IDs in the communication group.

At 305, in response to the first sharing operation, in the process of performing the communication based on the communication group, the data corresponding to the first hardware resource may be shared with the terminal device corresponding to at least one sharing ID in real time.

In embodiments of the present disclosure, the electronic device may automatically select the data corresponding to the first hardware resource as the data to be shared with the terminal devices corresponding to a part of IDs in the communication group; and in the process of performing the communication based on the communication group, may share the data corresponding to the first hardware resource with the terminal devices corresponding to a part of IDs in real time, which may not only realize limited data sharing, but also support intelligent automatic selection, simplify user operations, and further improve the intelligence of electronic devices.

Figure 4:
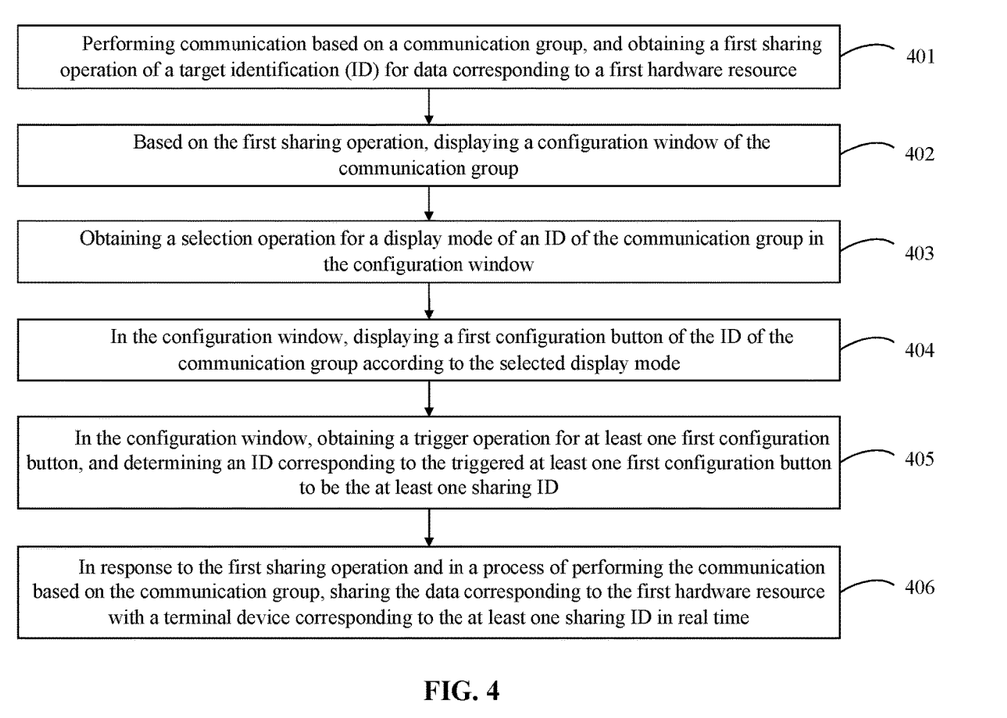
FIG. 4 illustrates another flowchart of an exemplary information processing method according to various disclosed embodiments of the present disclosure.

Embodiments of the present disclosure provide an information processing method. The information processing method may be applied to an electronic device. Referring to FIG. 4, the method may include the following.

At 401, the communication may be performed based on the communication group, and the first sharing operation of the target ID for the data corresponding to the first hardware resource may be obtained.

The first hardware resource may belong to the electronic device corresponding to the target ID; and the target ID may belong to the communication group.

At 402, based on the first sharing operation, a configuration window of the communication group may be displayed.

In embodiments of the present disclosure, the configuration window for displaying the communication group may at least be used to configure the display mode of the ID of the communication group. In different display modes, the ID of the communication group and the configuration button corresponding to the ID may have different correspondences.

At 403, a selection operation for the display mode of the ID of the communication group in the configuration window may be obtained.

At 404, in the configuration window, the first configuration button of the ID of the communication group may be displayed according to the selected display mode.

The first configuration button may be used to configure the ID corresponding to the first configuration button as the sharing ID when being triggered.

In embodiments of the present disclosure, at 404, in the configuration window, the first configuration button of the ID of the communication group may be displayed according to the selected display mode, which may be implemented in any one of following manners.

For the first manner, if the selected display mode is the first mode, each ID and the first configuration button of each ID may be displayed in the configuration window according to the first mode.

Herein, the first mode is a mode where the IDs and the configuration buttons are displayed in a one-to-one correspondence, that is, each ID may correspond to a unique configuration button. Triggering the first configuration button may trigger selection or exclusion of the ID as the sharing object corresponding to the sharing data.

Figure 5:
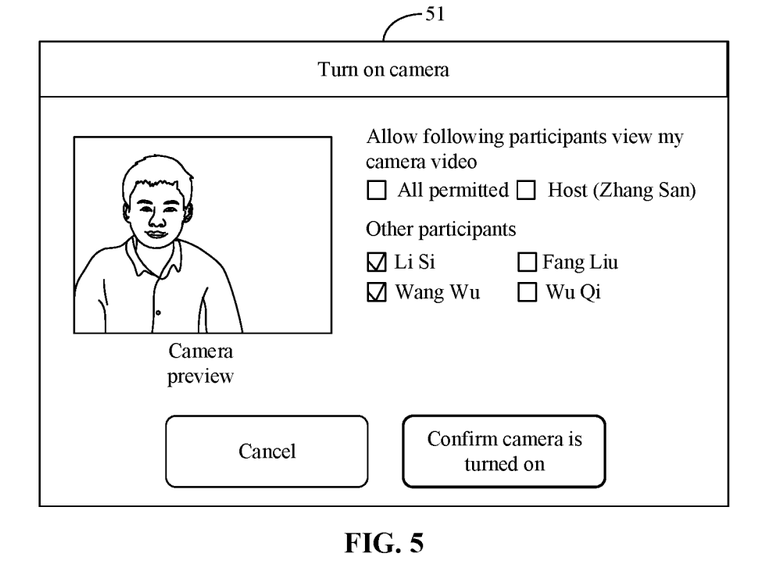
FIG. 5 illustrates an interface schematic of a first configuration window according to various disclosed embodiments of the present disclosure.

In an implementable scenario, the electronic device may perform communication based on the communication group, obtain the first sharing operation of the target ID for the data corresponding to the first hardware resource, and display the configuration window of the communication group based on the first sharing operation. In addition, in the configuration window, each ID and the first configuration button of each ID may be displayed in the configuration window according to the first mode. Referring to FIG. 5, taking the data corresponding to the first hardware resource as real-time pictures collected by the camera as an example, in the first mode, each ID and the first configuration button for each ID may be displayed in the first configuration window 51. In FIG. 5, the participant names may be used as the IDs; and the IDs of the host Zhang San and other participants including Li Si, and Wang Wu and the like may be displayed. The first configuration button may be correspondingly displayed in front of the name of each participant, as shown in the check box in FIG. 5. Herein, if the check box is selected, the terminal device corresponding to the participant's name may be triggered to be selected as the sharing object corresponding to the sharing data. As shown in FIG. 5, the check boxes corresponding to Li Si and Wang Wu may be selected.

For the second manner, if the selected display mode is the second mode, the ID of each category and the first configuration button of the ID of each category may be displayed in the configuration window according to the second mode.

Herein, the second mode may be a mode where the IDs and the configuration buttons are displayed in a multiple-to-one correspondence, that is, multiple IDs may correspond to one configuration button. Triggering the first configuration button may trigger selection or exclusion of multiple IDs as the sharing objects corresponding to the sharing data. The multiple IDs here may be a part of total IDs. It can be understood that total IDs may be divided into multiple types of IDs; and each type of ID may include at least one ID.

Figure 6:
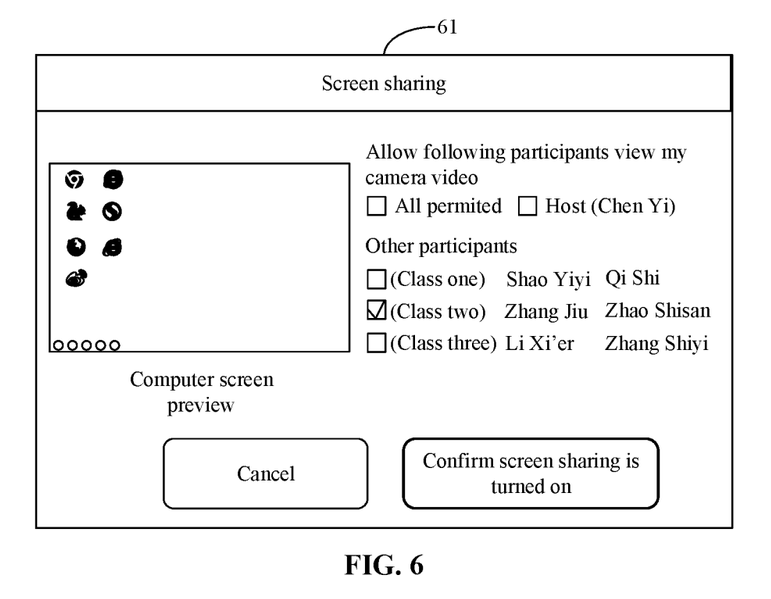
FIG. 6 illustrates an interface schematic of a second configuration window according to various disclosed embodiments of the present disclosure.

Referring to FIG. 6, in an implementable scenario, the electronic devices may perform communication based on the communication group, obtain the first sharing operation of the target ID for the data corresponding to the first hardware resource, and display the configuration window of the communication group based on the first sharing operation. In addition, in the configuration window, the first configuration button of the ID of each category may be displayed in the configuration window according to the second mode. Referring to FIG. 6, taking the data corresponding to the first hardware resource as real-time pictures presented by the screen as an example, in the second mode, the ID of each category and the first configuration button of the ID of each category may be displayed in the second configuration window 61. In FIG. 6, the participant names may be used as IDs; and the IDs of the host Chen Yi and other participants including Shao Yiyi, Qi Shi, Zhang Jiu, Zhao Shisan and the like may be displayed. The first configuration button may be correspondingly displayed in front of the category name of participants, as shown in the check box in FIG. 6. Herein, if the check box is selected, the terminal devices corresponding to the category name of participants may be triggered to be selected as the sharing objects corresponding to the sharing data. As shown in FIG. 6, the checkboxes corresponding to Zhang Jiu and Zhao Shisan who belong to the second class may be selected.

At 405, in the configuration window, the trigger operation for at least one first configuration button may be obtained, and the ID corresponding to the triggered at least one first configuration button may be determined to be at least one sharing ID.

At least one sharing ID may be a part of IDs in the communication group.

At 406, in response to the first sharing operation, in the process of performing the communication based on the communication group, the data corresponding to the first hardware resource may be shared with the terminal device corresponding to at least one sharing ID in real time.

In embodiments of the present disclosure, the electronic device may provide the configuration window for the group user corresponding to the target ID to select the data corresponding to the first hardware resource on the electronic device. That is, the data corresponding to the selected hardware resource may be used as the sharing data, and the terminal devices corresponding to a part of IDs in the communication group may be selected as the sharing objects, which may not only realize limited data sharing, but also facilitate users to flexibly configure sharing data and sharing objects according to their needs, thereby improving user experience of using electronic devices.

Figure 7:
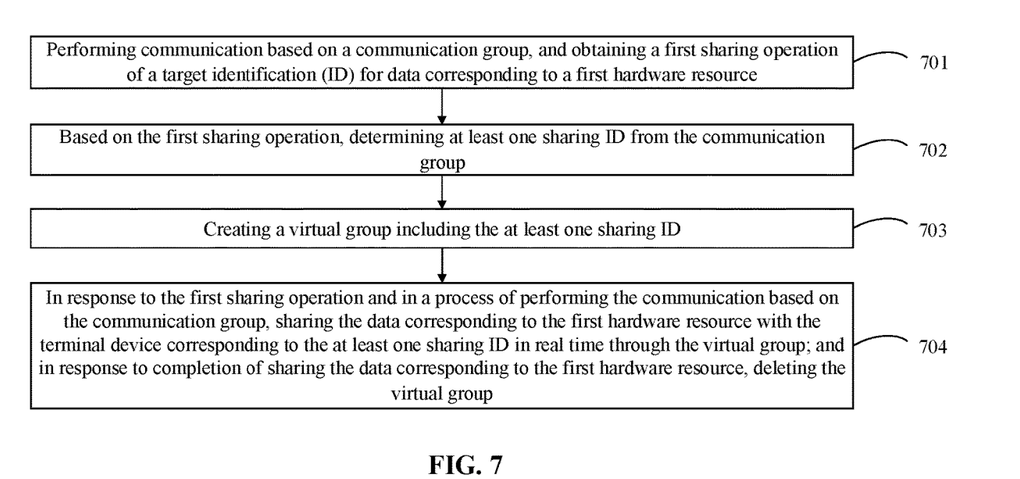
FIG. 7 illustrates another flowchart of an exemplary information processing method according to various disclosed embodiments of the present disclosure.

Embodiments of the present disclosure provide an information processing method. The information processing method may be applied to an electronic device. Referring to FIG. 7, the method may include the following.

At 701, the communication may be performed based on the communication group, and the first sharing operation of the target ID for the data corresponding to the first hardware resource may be obtained.

The first hardware resource may belong to the electronic device corresponding to the target ID; and the target ID may belong to the communication group.

At 702, at least one sharing ID may be determined from the communication group based on the first sharing operation.

At least one sharing ID may be a part of IDs in the communication group.

At 703, a virtual group including at least one sharing ID may be created.

At 704, in response to the first sharing operation, in the process of performing the communication based on the communication group, the data corresponding to the first hardware resource may be shared with the terminal device corresponding to at least one sharing ID in real time through the virtual group, and in response to completion of sharing the data corresponding to the first hardware resource, the virtual group may be deleted.

In embodiments of the present disclosure, the electronic device may create a new virtual group in the case of selecting a part of IDs in the communication group. The members of the virtual group are a part of IDs, which facilitates the users to know the data flow in real time during the process of real-time sharing of the data corresponding to the first hardware resource. Moreover, when the sharing of the data corresponding to the first hardware resource is stopped, the virtual group may be automatically deleted. In a multi-member communication scenario in the existing technology, if a new group is created to share data with some members, the newly created group may still exist after the sharing is completed unless being manually deleted.

In other embodiments of the present disclosure, in the configuration window, a preview sub-window of data corresponding to the first hardware resource may be displayed, and/or the second configuration button may be displayed. The second configuration button may be used to determine all IDs of the communication group as the sharing IDs of the data corresponding to the first hardware resource when being triggered. In some embodiments, when the electronic device previews the data corresponding to the first hardware resource in real time in the preview sub-window, the user corresponding to the target ID may suddenly want to cancel the limitation and allow all other users to view the content. In such way, through quick triggering of the second configuration button, the terminal devices corresponding to other IDs in the communication group may view real-time data corresponding to the first hardware resource, perform real-time data sharing for the data corresponding to the first hardware resource from the time that the limitation is canceled.

Figure 8:
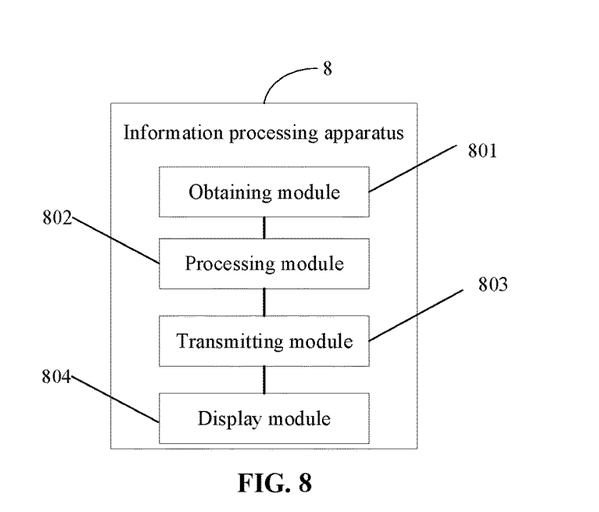
FIG. 8 illustrates a structural schematic of an information processing apparatus according to various disclosed embodiments of the present disclosure.

Embodiments of the present disclosure provide an information processing apparatus. The information processing apparatus may be applied to the information processing method provided by embodiments corresponding to FIGS. 1-4 and FIG. 7. Referring to FIG. 8, the information processing apparatus 8 may include:

an obtaining module 801, configured to perform the communication based on the communication group and obtain the first sharing operation of the target ID for the data corresponding to the first hardware resource, where the first hardware resource may belong to the electronic device corresponding to the target ID; and the target ID may belong to the communication group;

a processing module 802, configured to determine at least one sharing ID from the communication group based on the first sharing operation, where at least one sharing ID may be a part of IDs in the communication group; and a transmitting module 803, configured to in response to the first sharing operation, in the process of performing the communication based on the communication group, share the data corresponding to the first hardware resource with the terminal device corresponding to at least one sharing ID in real time.

In other embodiments of the present disclosure, the obtaining module 801 may be configured to obtain the second sharing operation of the target ID for the data corresponding to the second hardware resource. The second hardware resource may belong to the electronic device; and the second hardware resource may be different from the first hardware resource.

The transmitting module 803 may be configured to, when sharing the data corresponding to the first hardware resource with the terminal device corresponding to at least one sharing ID in the real time, responding to the second sharing operation, and in the process of performing the communication based on the communication group, share the data corresponding to the second hardware resource with terminal devices corresponding to remaining IDs in the communication group in real time. The communication group may be the group formed by the remaining IDs and the target ID.

In other embodiments of the present disclosure, the processing module 802 may be configured to perform the communication based on the communication group and determine the subgroup to which the target ID belongs in the historical communication scenario of the communication group, where the subgroup is a group formed by a part of IDs; and may determine the hardware resource corresponding to the data shared by the target ID in the subgroup as the first hardware resource.

In other embodiments of the present disclosure, the information processing apparatus 8 may further include a display module 804, configured to display the configuration window of the communication group based on the first sharing operation.

The obtaining module 801 may be configured to obtain the selection operation of the display mode for the ID of the communication group in the configuration window.

The display module 804 may be configured to display the first configuration button of the ID of the communication group according to the selected display mode in the configuration window.

The obtaining module 801 may be configured to obtain the trigger operation for at least one first configuration button in the configuration window and determine the ID corresponding to the triggered first configuration button as the sharing ID.

In other embodiments of the present disclosure, the processing module 802 may be configured to, if the selected display mode is the first mode, display each ID and the first configuration button of each ID in the configuration window according to the first mode.

In other embodiments of the present disclosure, the processing module 802 may be configured to, if the selected display mode is the second mode, display the ID of each category and the first configuration of the ID of each category in the configuration window according to the second mode button.

In other embodiments of the present disclosure, the processing module 802 may be configured to create the virtual group including at least one sharing ID; the transmitting module 803 may be configured to, in response to the first sharing operation, share the data corresponding to the first hardware resource to the terminal device corresponding to at least one sharing ID in real time through the virtual group during the communication based on the communication group; and the processing module 802 may be configured to delete the virtual group in response to completion of sharing the data corresponding to the first hardware resource.

It should be noted that, for the implementation process executed by the processor in one embodiment, reference may be made to the implementation process in the information processing methods provided in embodiments corresponding to FIGS. 1-4 and FIG. 7, which may not be described in detail herein.

For the information processing apparatus provided by embodiments of the present disclosure, the communication may be performed based on the communication group, and the first sharing operation of the target ID for the data corresponding to the first hardware resource may be obtained; the first hardware resource may belong to the electronic device corresponding to the target ID; the target ID may belong to the communication group; at least one sharing ID may be determined from the communication group based on the first sharing operation; at least one sharing ID may be a part of IDs in the communication group; and in response to the first sharing operation, in the process of performing the communication based on the communication group, the data corresponding to the first hardware resource may be shared with the terminal device corresponding to at least one sharing ID in real time. In such way, in the communication scenario of group communication, the group user corresponding to the target ID may determine the sharing object of the data corresponding to the first hardware resource in real time through the first sharing operation on the data corresponding to the first hardware resource, and further share the data corresponding to the first hardware resource in real time with the terminal device corresponding to the real-time selected sharing ID. Moreover, in the present disclosure, the data corresponding to the first hardware resource may be shared in real time, that is, once the sharing is triggered, the sharing may continue in case of the sharing is not triggered to be stopped, thereby providing a limited manner of sharing data and improving the intelligence of the electronic device.

Figure 9:
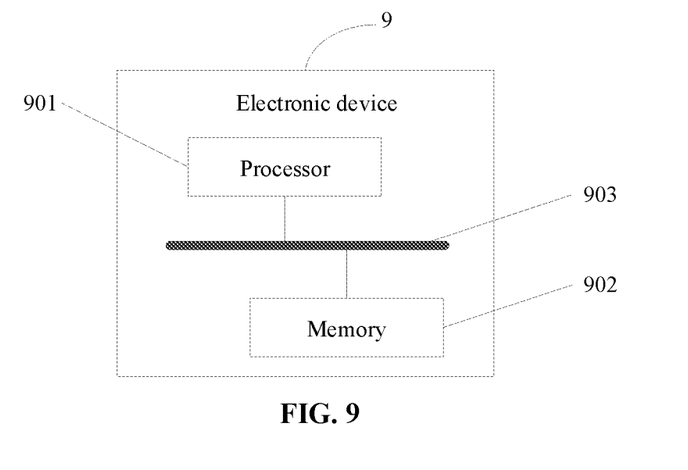
FIG. 9 illustrates a structural schematic of an electronic device according to various disclosed embodiments of the present disclosure.

Embodiments of the present disclosure provide an electronic device. The electronic device may be applied to the information processing method provided by embodiments corresponding to FIGS. 1-4 and FIG. 7. Referring to FIG. 9, the electronic device 9 may include a processor 901, a memory 902, and a communication bus 903.

The communication bus 903 may be configured to implement the communication connection between the processor 901 and the memory 902.

The processor 901 may be configured to execute the information processing program stored in the memory 902 to implement: performing communication based on a communication group, and obtaining a first sharing operation of a target identification (ID) for data corresponding to a first hardware resource, where the first hardware resource belongs to an electronic device corresponding to the target ID, and the target ID belongs to the communication group; based on the first sharing operation, determining at least one sharing ID from the communication group, where the at least one sharing ID is a part of IDs in the communication group; and in response to the first sharing operation and in a process of performing the communication based on the communication group, sharing the data corresponding to the first hardware resource with a terminal device corresponding to the at least one sharing ID in real time.

In other embodiments of the present disclosure, the processor 901 may be configured to execute the information processing program stored in the memory 902 to implement: obtaining a second sharing operation of the target ID for data corresponding to a second hardware resource, where the second hardware resource belongs to the electronic device, and the second hardware resource is different from the first hardware resource; and when sharing the data corresponding to the first hardware resource with the terminal device corresponding to the at least one sharing ID in the real time, responding to the second sharing operation, and in the process of performing the communication based on the communication group, sharing the data corresponding to the second hardware resource with terminal devices corresponding to remaining IDs in the communication group in real time, where the communication group is a group formed by the remaining IDs and the target ID.

In other embodiments of the present disclosure, the processor 901 may be configured to execute the information processing program stored in the memory 902 to implement: performing the communication based on the communication group and determining a subgroup to which the target ID belongs in historical communication scenario of the communication group, where the subgroup is a group formed by a part of IDs; and determining a hardware resource corresponding to data shared by the target ID in the subgroup as the first hardware resource.

In other embodiments of the present disclosure, the processor 901 may be configured to execute the information processing program stored in the memory 902 to implement: based on the first sharing operation, displaying a configuration window of the communication group; obtaining a selection operation for a display mode of an ID of the communication group in the configuration window; in the configuration window, displaying a first configuration button of the ID of the communication group according to the selected display mode; and in the configuration window, obtaining a trigger operation for at least one first configuration button, and determining an ID corresponding to the triggered at least one first configuration button to be the at least one sharing ID.

In other embodiments of the present disclosure, the processor 901 may be configured to execute the information processing program stored in the memory 902 to implement: in response to the selected display mode being a first mode, and according to the first mode, displaying each ID and a first configuration button of each ID in the configuration window.

In other embodiments of the present disclosure, the processor 901 may be configured to execute the information processing program stored in the memory 902 to implement: in response to the selected display mode being a second mode, and according to the second mode, displaying an ID of each category and a first configuration button of the ID of each category in the configuration window.

In other embodiments of the present disclosure, the processor 901 may be configured to execute the information processing program stored in the memory 902 to implement: creating a virtual group including the at least one sharing ID; and in response to the first sharing operation and in the process of performing the communication based on the communication group, sharing the data corresponding to the first hardware resource with the terminal device corresponding to the at least one sharing ID in real time through the virtual group; and in response to completion of sharing the data corresponding to the first hardware resource, deleting the virtual group.

Exemplarily, the processor may be an integrated circuit chip with signal processing capability, including a general-purpose processor, a digital signal processor (DSP), other programmable logic devices, discrete gate or transistor logic devices, discrete hardware components, or the like. The general-purpose processor may be a microprocessor, any conventional processor, or the like.

It should be noted that, for the implementation process executed by the processor in one embodiment, reference may be made to the implementation process in the information processing methods provided in embodiments corresponding to FIGS. 1-4 and FIG. 7, which may not be limited in detail herein.

For the electronic device provided by embodiments of the present disclosure, the communication may be performed based on the communication group, and the first sharing operation of the target ID for the data corresponding to the first hardware resource may be obtained; the first hardware resource may belong to the electronic device corresponding to the target ID; the target ID may belong to the communication group; at least one sharing ID may be determined from the communication group based on the first sharing operation; at least one sharing ID may be a part of IDs in the communication group; and in response to the first sharing operation and in the process of performing the communication based on the communication group, the data corresponding to the first hardware resource may be shared with the terminal device corresponding to at least one sharing ID in real time. In such way, in the communication scenario of group communication, the group user corresponding to the target ID may determine the sharing object of the data corresponding to the first hardware resource in real time through the first sharing operation on the data corresponding to the first hardware resource, and further share the data corresponding to the first hardware resource in real time with the terminal device corresponding to a real-time selected sharing ID. Moreover, in the present disclosure, the data corresponding to the first hardware resource may be shared in real time, that is, once the sharing is triggered, the sharing may continue in case of the sharing is not triggered to be stopped, thereby providing a limited manner of sharing data and improving the intelligence of the electronic device.

Embodiments of the present application provide a non-transitory computer-readable storage medium, where one or more programs are stored in the non-transitory computer-readable storage medium. The one or more programs may be executed by one or more processors to implement the implementation process in the information processing method provided in embodiments corresponding to FIGS. 1-4 and FIG. 7, which may not be described in detail herein.

For the non-transitory computer-readable storage medium provided by embodiments of the present disclosure, the communication may be performed based on the communication group, and the first sharing operation of the target ID for the data corresponding to the first hardware resource may be obtained; the first hardware resource may belong to the electronic device corresponding to the target ID; the target ID may belong to the communication group; at least one sharing ID may be determined from the communication group based on the first sharing operation; at least one sharing ID may be a part of IDs in the communication group; and in response to the first sharing operation and in the process of performing the communication based on the communication group, the data corresponding to the first hardware resource may be shared with the terminal device corresponding to at least one sharing ID in real time. In such way, in the communication scenario of group communication, the group user corresponding to the target ID may determine the sharing object of the data corresponding to the first hardware resource in real time through the first sharing operation on the data corresponding to the first hardware resource, and further share the data corresponding to the first hardware resource in real time with the terminal device corresponding to a real-time selected sharing ID. Moreover, in the present disclosure, the data corresponding to the first hardware resource may be shared in real time, that is, once the sharing is triggered, the sharing may continue in case of the sharing is not triggered to be stopped, thereby providing a limited manner of sharing data and improving the intelligence of the electronic device.

It should be understood by those skilled in the art that embodiments of the present disclosure may provide a method, a system, or a computer program product. Therefore, the present disclosure may take the form of a hardware embodiment, a software embodiment, or an embodiment combining software and hardware aspects. Furthermore, the present disclosure may take the form of a computer program product embodied on one or more computer-usable storage media (including but not limited to disk storage, optical storage, and the like) having computer-usable program code embodied therein.

The present disclosure is described with reference to flowchart illustrations and/or block diagrams of methods, apparatuses (systems), and computer program products according to embodiments of the present disclosure. It can be understood that each process and/or block in the flowchart illustrations and/or block diagrams and combinations of processes and/or blocks in the flowchart illustrations and/or block diagrams can be implemented by computer program instructions. These computer program instructions may be provided to the processors of a general-purpose computer, a special purpose computer, an embedded processor, or other programmable data processing devices to generate a product, such that the instructions executed by the processors of the computer or other programmable data processing devices may produce an apparatus for implementing the functions specified in one or more flows of the flowcharts and/or one or more blocks of the block diagrams.

These computer program instructions may also be stored in a computer-readable memory capable of directing a computer or other programmable data processing devices to function in a particular manner, such that the instructions stored in the computer-readable memory may generate a product comprising an instruction apparatus. The instruction apparatus may implement the functions specified in one or more flows of the flowcharts and/or one or more blocks of the block diagrams.

These computer program instructions may also be loaded on a computer or other programmable data processing devices, such that a series of operation steps may be performed on the computer or other programmable devices to produce a computer-implemented processing. Therefore, the instructions executing on a computer or other programmable devices may thus provide steps for implementing the functions specified in one or more flows of the flowcharts and/or one or more blocks of the block diagrams.

The above may merely optional embodiments of the present disclosure and may not be intended to limit the protection scope of the present disclosure.

What is claimed is:
1. An information processing method, comprising:
performing communication on among a plurality of identifications (IDs) in a communication group, and obtaining a first sharing operation of a target ID for data corresponding to a first hardware resource, wherein the first hardware resource belongs to an electronic device corresponding to the target ID, and the target ID is one of the plurality of IDs;

based on the first sharing operation, selecting a part of the plurality of IDs participating in the communication as a sharing object while the plurality of IDs are performing the communication, wherein the selecting enables the electronic device corresponding to the target ID to automatically choose the part of the plurality of IDs based on at least one of the data to be shared and originating from the first hardware resource, and a user obtained trigger operation which triggers a selection or an exclusion of an ID in the plurality of IDs as the sharing object corresponding to sharing data;

in response to the first sharing operation, sharing the data corresponding to the first hardware resource with one or more terminal devices corresponding to the sharing object in real time while the plurality of IDs are performing the communication;

obtaining a second sharing operation of the target ID for data corresponding to a second hardware resource, wherein the second hardware resource belongs to the electronic device, and the second hardware resource is different from the first hardware resource; and responding to the second sharing operation, sharing the data corresponding to the second hardware resource with terminal devices corresponding to remaining ones of the plurality of IDs in real time while the plurality of IDs are performing the communication and while the data corresponding to the first hardware resource is still being shared with the one or more terminal devices corresponding to the sharing object in the real time.

2. The method according to claim 1, wherein based on the first sharing operation, selecting the part of the plurality of IDs participating in the communication as the sharing object further includes:

based on the first sharing operation, displaying a configuration window of the communication group;

obtaining a selection operation for a display mode of an ID of the communication group in the configuration window;

in the configuration window, displaying a first configuration button of the ID of the communication group according to the selected display mode; and in the configuration window, obtaining the trigger operation for at least one first configuration button, and selecting an ID corresponding to the triggered at least one first configuration button to be the sharing object.

3. The method according to claim 2, wherein in the configuration window, displaying the first configuration button of the ID of the communication group according to the selected display mode further includes:

in response to the selected display mode being a first mode, and according to the first mode, displaying each ID and a first configuration button of each ID in the configuration window.

4. The method according to claim 2, wherein in the configuration window, displaying the first configuration button of the ID of the communication group according to the selected display mode further includes:

in response to the selected display mode being a second mode, and according to the second mode, displaying an ID of each category and a first configuration button of the ID of each category in the configuration window.

5. The method according to claim 2, further comprising:

in the configuration window, displaying a preview subwindow of the data corresponding to the first hardware resource, and/or displaying a second configuration button, wherein:

the second configuration button is configured to select all of the plurality of IDs as the sharing object of the data corresponding to the first hardware resource when being triggered.

6. The method according to claim 1, before obtaining the first sharing operation of the target ID for the data corresponding to the first hardware resource, further including:

performing the communication among the plurality of IDs and determining a subgroup to which the target ID belongs in historical communication scenario of the communication group, wherein the subgroup is a group formed by one or more of the plurality of IDs; and determining a hardware resource corresponding to data shared by the target ID in the subgroup in the historical communication scenario as the first hardware resource.

7. The method according to claim 6, further comprising:

determining the data for sharing and the part of the plurality of IDs based on the subgroup that the target ID joins and the hardware resource corresponding to the data shared by the target ID in the subgroup in the historical communication scenario.

8. The method according to claim 1, after selecting the part of the plurality of IDs participating in the communication as the sharing object based on the first sharing operation, further including:

creating a virtual group including the sharing object; and in response to the first sharing operation, sharing the data corresponding to the first hardware resource with the one or more terminal devices corresponding to the sharing object in real time while the plurality of IDs are performing the communication includes:

in response to the first sharing operation, sharing the data corresponding to the first hardware resource with the one or more terminal devices corresponding to the sharing object in real time through the virtual group while the plurality of IDs are performing the communication; and in response to completion of sharing the data corresponding to the first hardware resource, deleting the virtual group.

9. The method according to claim 1, further comprising: determining the part of the plurality of IDs for sharing the data corresponding to the first hardware resource according to a time of each of the plurality of IDs joining the communication group.

10. An electronic device, comprising:

a processor, a memory, and a communication bus, wherein:

the communication bus is configured to implement a communication connection between the processor and the memory; and when an information processing program stored in the memory being executed for implementing an information processing method, the processor is configured to:

perform communication among a plurality of identifications (IDs) in a communication group, and obtain a first sharing operation of a target ID for data corresponding to a first hardware resource, wherein the first hardware resource belongs to an electronic device corresponding to the target ID, and the target ID is one of the plurality of IDs;

based on the first sharing operation, select a part of the plurality of IDs participating in the communication as a sharing object while the plurality of IDs are performing the communication, wherein the selecting enables the electronic device corresponding to the target ID to automatically choose the part of the plurality of IDs based on at least one of the data to be shared and originating from the first hardware resource, and a user obtained trigger operation which triggers a selection or an exclusion of an ID in the plurality of IDs as the sharing object corresponding to sharing data;

in response to the first sharing operation, share the data corresponding to the first hardware resource with one or more terminal devices corresponding to the sharing object in real time while the plurality of IDs are performing the communication;

obtain a second sharing operation of the target ID for data corresponding to a second hardware resource, wherein the second hardware resource belongs to the electronic device, and the second hardware resource is different from the first hardware resource; and responding to the second sharing operation, share the data corresponding to the second hardware resource with terminal devices corresponding to remaining ones of the plurality of IDs in real time while the plurality of IDs are performing the communication and while the data corresponding to the first hardware resource is still being shared with the one or more terminal devices corresponding to the sharing object in the real time.

11. The electronic device according to claim 10, wherein: based on the first sharing operation, for selecting the part of the plurality of IDs participating in the communication as the sharing object, the processor is configured to:

based on the first sharing operation, display a configuration window of the communication group; obtain a selection operation for a display mode of an ID of the communication group in the configuration window;

in the configuration window, display a first configuration button of the ID of the communication group according to the selected display mode; and in the configuration window, obtain the trigger operation for at least one first configuration button, and select an ID corresponding to the triggered at least one first configuration button to be the sharing object.

12. The electronic device according to claim 11, wherein:
in the configuration window, for displaying the first configuration button of the ID of the communication group according to the selected display mode, the processor is configured to: in response to the selected display mode being a first mode, and according to the first mode, display each ID and a first configuration button of each ID in the configuration window.

13. The electronic device according to claim 11, wherein:
in the configuration window, for displaying the first configuration button of the ID of the communication group according to the selected display mode, the processor is configured to:

in response to the selected display mode being a second mode, and according to the second mode, display an ID of each category and a first configuration button of the ID of each category in the configuration window.

14. The electronic device according to claim 11, wherein:
the processor is configured to, in the configuration window, display a preview sub-window of the data corresponding to the first hardware resource, and/or display a second configuration button, wherein:

the second configuration button is configured to select all of the plurality of IDs as the sharing object of the data corresponding to the first hardware resource when being triggered.

15. The electronic device according to claim 10, wherein:
before the first sharing operation of the target ID for the data corresponding to the first hardware resource is obtained, the processor is configured to:

perform the communication among the plurality of IDs and determining a subgroup to which the target ID belongs in historical communication scenario of the communication group, wherein the subgroup is a group formed by one or more of the plurality of IDs; and determine a hardware resource corresponding to data shared by the target ID in the subgroup in the historical communication scenario as the first hardware resource.

16. The electronic device according to claim 10, wherein:
after the part of the plurality of IDs participating in the communication based on the first sharing operation is selected as the sharing object, the processor is configured to:

create a virtual group including the sharing object; and in response to the first sharing operation, share the data corresponding to the first hardware resource with the one or more terminal devices corresponding to the sharing object in real time through the virtual group while the plurality of IDs are performing the communication; and in response to completion of sharing the data corresponding to the first hardware resource, delete the virtual group.

17. A non-transitory computer-readable storage medium, containing computer program for, when executed by a processor, performing an information processing method, the method comprising:

performing communication among a plurality of identifications (IDs) in a communication group, and obtaining a first sharing operation of a target ID for data corresponding to a first hardware resource, wherein the first hardware resource belongs to an electronic device corresponding to the target ID, and the target ID is one of the plurality of IDs;

based on the first sharing operation, selecting a part of the plurality of IDs participating in the communication as a sharing object while the plurality of IDs are performing the communication, wherein the selecting enables the electronic device corresponding to the target ID to automatically choose the part of the plurality of IDs based on at least one of the data to be shared and originating from the first hardware resource, and a user obtained trigger operation which triggers a selection or an exclusion of an ID in the plurality of IDs as the sharing object corresponding to sharing data;

in response to the first sharing operation, sharing the data corresponding to the first hardware resource with one or more terminal devices corresponding to the sharing object in real time while the plurality of IDs are performing the communication;

obtaining a second sharing operation of the target ID for data corresponding to a second hardware resource, wherein the second hardware resource belongs to the electronic device, and the second hardware resource is different from the first hardware resource; and responding to the second sharing operation, sharing the data corresponding to the second hardware resource with terminal devices corresponding to remaining ones of the plurality of IDs in real time while the plurality of IDs are performing the communication and while the data corresponding to the first hardware resource is still being shared with the one or more terminal devices corresponding to the sharing object in the real time.

* * * * *